(12) United States Patent
Olejarski et al.

(10) Patent No.: US 9,028,894 B2
(45) Date of Patent: May 12, 2015

(54) GUM MANUFACTURING SYSTEM WITH LOAFING AND CONDITIONING FEATURES

(75) Inventors: Jim Olejarski, Rockford, IL (US);
Joseph Roarty, Rockford, IL (US);
Arthur W. Upmann, Rockford, IL (US);
James A. Duggan, Machesney Park, IL (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 68 days.

(21) Appl. No.: 13/483,638

(22) Filed: May 30, 2012

(65) Prior Publication Data
US 2012/0237633 A1    Sep. 20, 2012

Related U.S. Application Data

(62) Division of application No. 12/352,110, filed on Jan. 12, 2009, now Pat. No. 8,226,401.

(51) Int. Cl.
*A23G 4/02*     (2006.01)
*A23G 4/04*     (2006.01)
(Continued)

(52) U.S. Cl.
CPC .............. *B29C 47/0019* (2013.01); *A23G 4/02* (2013.01); *A23G 4/04* (2013.01); *A23G 7/0068* (2013.01);
(Continued)

(58) Field of Classification Search
CPC ........... A23G 4/02; A23G 4/04; A23G 4/043; B29C 47/34; B29C 2947/92066; B29C 2947/92209; B29C 2947/92561; B29C 2947/92933

USPC .......... 426/3, 4, 5, 6, 104, 414, 412, 516, 519, 426/496, 497, 524; 425/133.5, 205, 296, 425/315, 335, 337, 377, 202, 206, 232, 404, 425/445, 446
See application file for complete search history.

(56) References Cited

U.S. PATENT DOCUMENTS 2,496,548 A    2/1950  La Rosa et al.
2,771,637 A    11/1956 Silvasy et al.
(Continued)

FOREIGN PATENT DOCUMENTS

EP        1894476 A2    3/2008

OTHER PUBLICATIONS

EP Search Report and Opinion EP 10 25 0033.7 dated Feb. 10, 2011.

*Primary Examiner* — Seyed Masoud Malekzadeh
(74) *Attorney, Agent, or Firm* — Cantor Colburn LLP

(57) ABSTRACT

Gum manufacturing machinery and method of manufacturing gum is illustrated in which a gum loafing machine generates loaves of finished gum that are then subsequently run through a gum conditioner to more uniformly set the temperature and viscosity of the gum material prior to further processing. Upon achieving the appropriate conditioning level, a further forming extruder may be used to generate a continuous gum ribbon for subsequent rolling and scoring operations. The gum conditioner may include vertically stacked conveyors that have different operational modes including a first mode that provides a serpentine path for a long residence time and a second mode that provides a cascading path that avoids or bypasses much of the length of some of the conveyors to provide a shorter residence time. The gum manufacturing machinery may be used in an adjustable manner so as to accommodate difference gum recipes for different batches of gum product.

6 Claims, 3 Drawing Sheets

(51) Int. Cl.
*B29C 47/00* (2006.01)
*A23G 7/00* (2006.01)
*B29C 47/34* (2006.01)
*B29C 47/36* (2006.01)
*B29C 47/92* (2006.01)
*B29C 47/40* (2006.01)
*B29C 47/10* (2006.01)

(52) U.S. Cl.
CPC ......... *B29C 47/0066* (2013.01); *B29C 47/1081* (2013.01); *B29C 47/34* (2013.01); *B29C 47/366* (2013.01); *B29C 47/92* (2013.01); *B29C 2947/92066* (2013.01); *B29C 2947/92209* (2013.01); *B29C 2947/92228* (2013.01); *B29C 2947/92561* (2013.01); *B29C 2947/92704* (2013.01); *B29C 2947/92723* (2013.01); *B29C 2947/92933* (2013.01); *B29C 47/1018* (2013.01); *B29C 47/1027* (2013.01); *B29C 47/40* (2013.01)

(56) References Cited

U.S. PATENT DOCUMENTS

| | | | |
|---|---|---|---|
| 3,455,755 A | 7/1969 | Phillips | |
| 3,570,417 A | 3/1971 | Herrmann et al. | |
| 3,585,923 A | 6/1971 | Waller | |
| 3,644,169 A | 2/1972 | Phillips | |
| 3,652,377 A | 3/1972 | Helmick | |
| 3,806,290 A | 4/1974 | Graff et al. | |
| 3,908,032 A | 9/1975 | Didelot et al. | |
| 3,969,513 A | 7/1976 | Canonne | |
| 4,266,920 A | 5/1981 | Hayashi et al. | |
| 4,541,824 A * | 9/1985 | Muller | 493/29 |
| 4,555,407 A | 11/1985 | Kramer et al. | |
| 4,579,738 A | 4/1986 | Cherukuri et al. | |
| 4,587,125 A | 5/1986 | Cherukuri et al. | |
| 4,614,264 A * | 9/1986 | Fishburne | 222/55 |
| 4,850,842 A | 7/1989 | Van Alstine | |
| 4,882,172 A | 11/1989 | Van Alstine | |
| 4,882,175 A | 11/1989 | Ream et al. | |
| 4,940,594 A | 7/1990 | Van Alstine | |
| 5,045,325 A | 9/1991 | Lesko et al. | |
| 5,170,877 A | 12/1992 | Francioni | |
| 5,205,106 A | 4/1993 | Zimmermann et al. | |
| 5,436,013 A | 7/1995 | Synosky et al. | |
| 5,538,742 A | 7/1996 | McHale et al. | |
| 5,611,420 A | 3/1997 | Heim et al. | |
| 5,756,133 A * | 5/1998 | Duggan et al. | 426/3 |
| 5,789,002 A | 8/1998 | Duggan et al. | |
| 5,792,495 A | 8/1998 | Degady et al. | |
| 5,837,302 A * | 11/1998 | Degady et al. | 426/3 |
| 5,853,243 A * | 12/1998 | Duggan et al. | 366/76.9 |
| 5,944,266 A | 8/1999 | Degady et al. | |
| 5,971,739 A | 10/1999 | Hoffman et al. | |
| 6,056,429 A * | 5/2000 | Duggan et al. | 366/76.1 |
| 6,168,306 B1 | 1/2001 | Degady et al. | |
| 6,214,389 B1 | 4/2001 | Hoffman et al. | |
| 6,254,373 B1 | 7/2001 | Hoffman et al. | |
| 6,375,448 B1 * | 4/2002 | Duggan et al. | 425/89 |
| 6,601,708 B1 * | 8/2003 | Degady et al. | 209/234 |
| 6,630,182 B1 | 10/2003 | Warrington et al. | |
| 6,878,390 B2 | 4/2005 | Murray et al. | |
| 7,112,345 B1 | 9/2006 | McHale et al. | |
| 7,771,182 B2 | 8/2010 | Fornaguera | |
| 2008/0057154 A1* | 3/2008 | Acar | 426/5 |
| 2009/0162475 A1 | 6/2009 | Duggan et al. | |
| 2009/0162476 A1 | 6/2009 | Duggan et al. | |

* cited by examiner

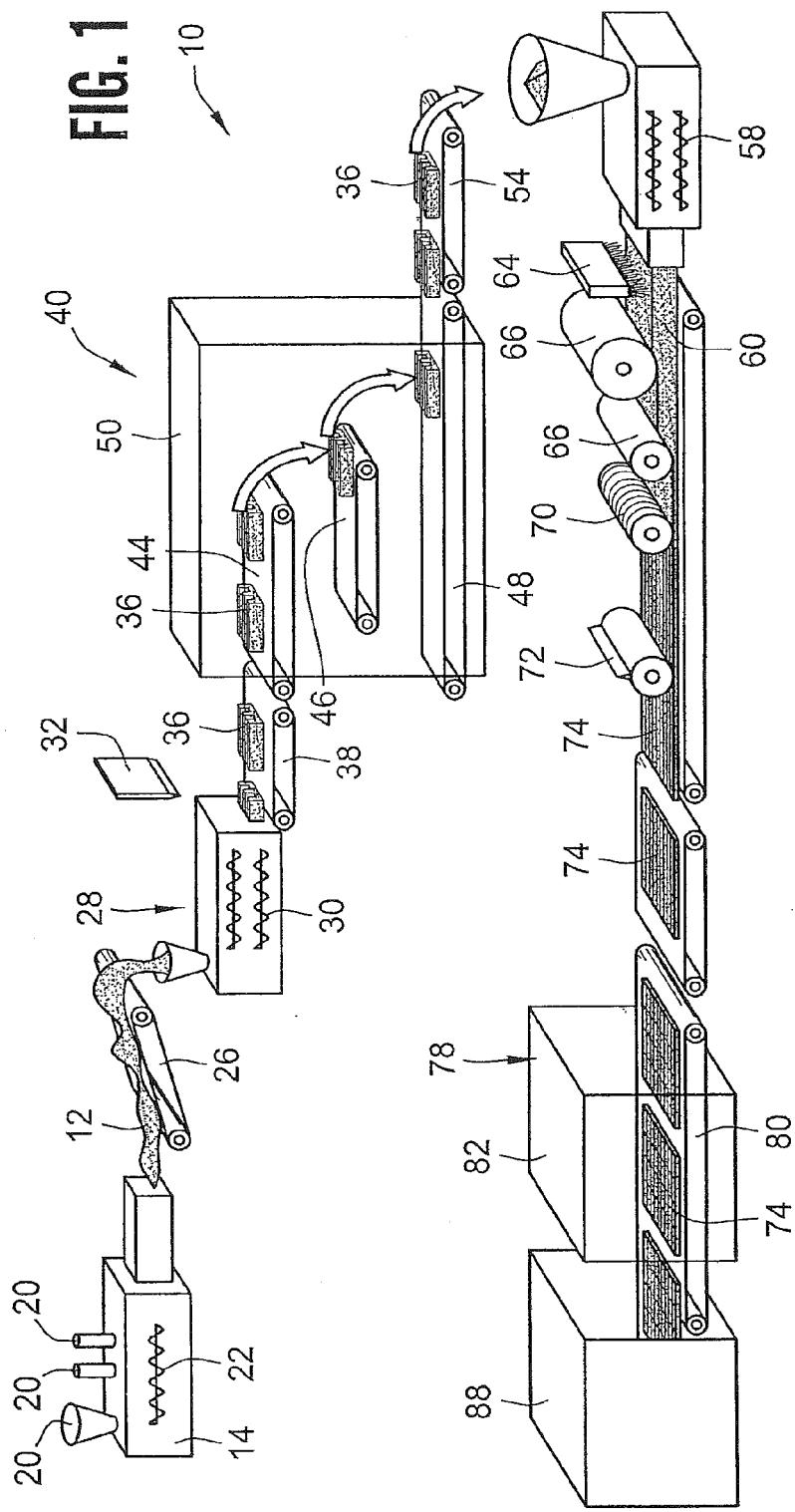
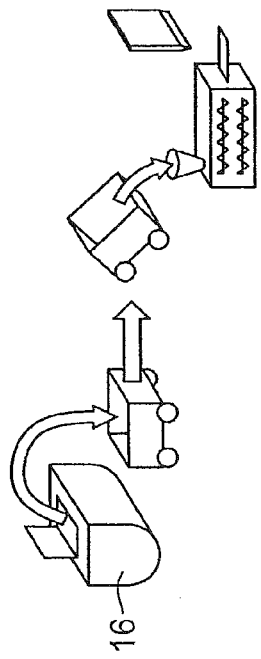

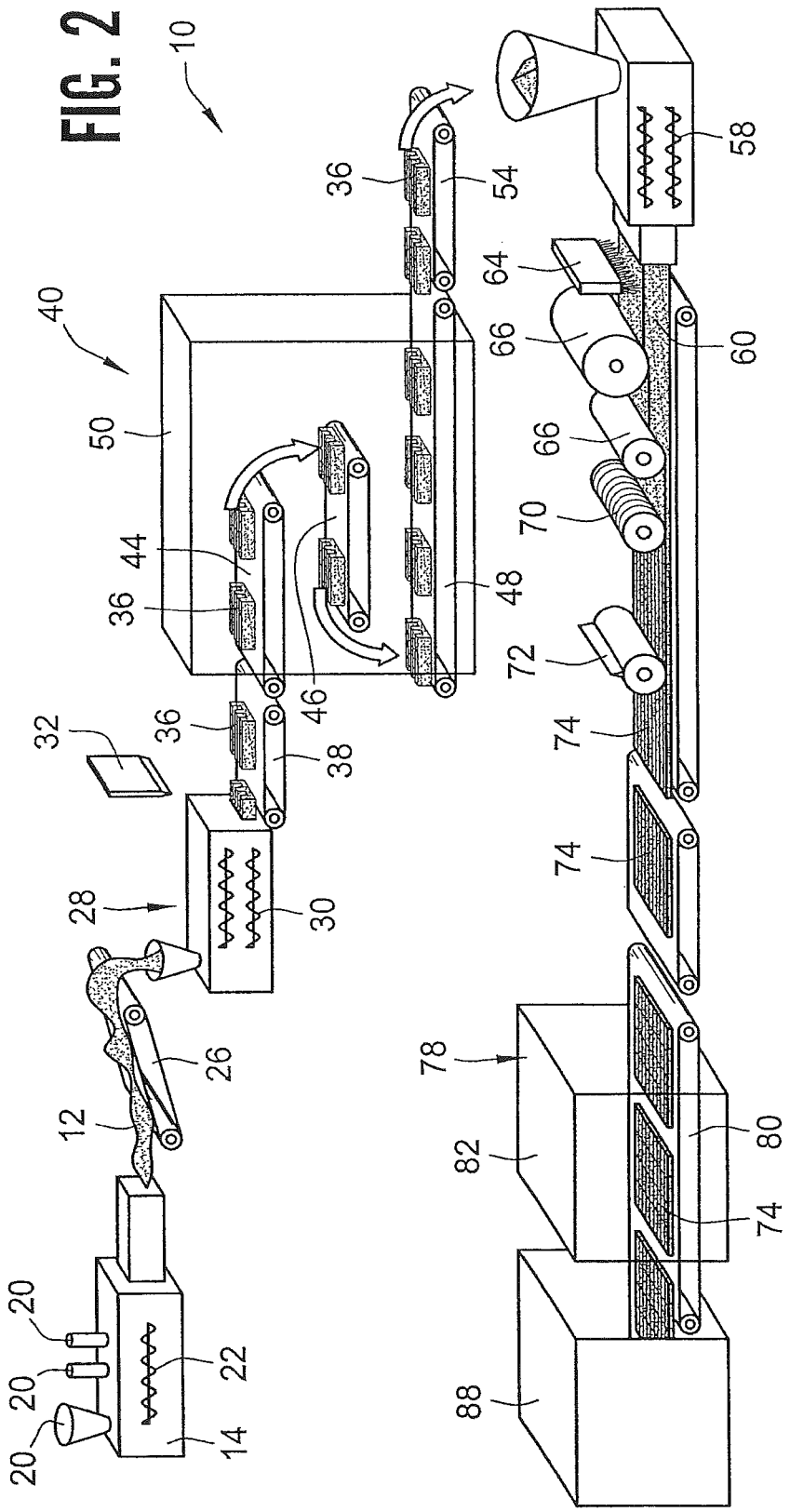

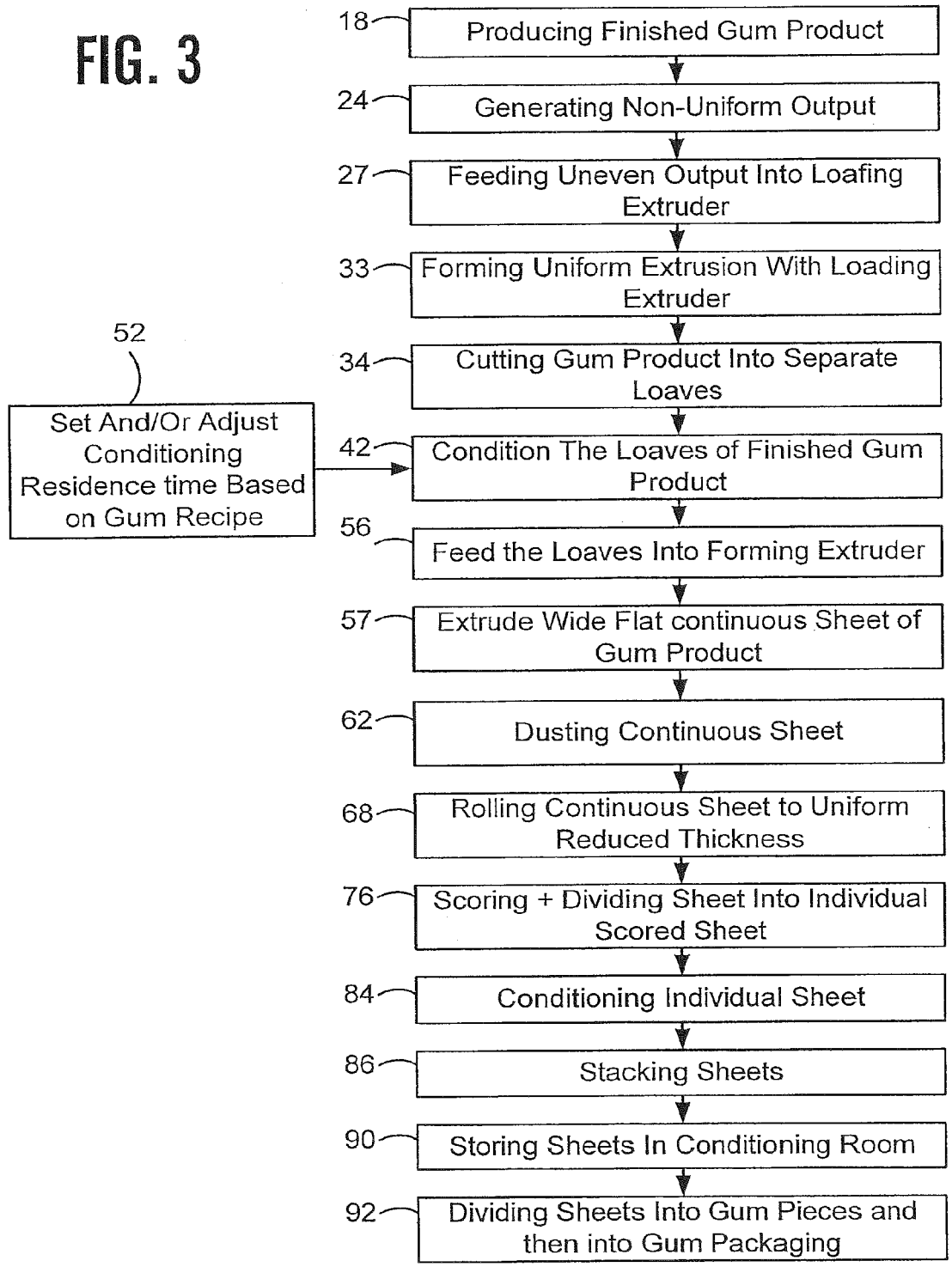

GUM MANUFACTURING SYSTEM WITH LOAFING AND CONDITIONING FEATURES

CROSS-REFERENCE TO RELATED APPLICATIONS

This application is a Divisional Application of U.S. patent application Ser. No. 12/352,110 filed on Jan. 12, 2009, now issued as U.S. Pat. No. 8,226,401, which is herein incorporated by reference in its entirety.

FIELD OF THE INVENTION

The present invention relates to gum manufacturing methods and systems and more particularly relates to the forming and conditioning of gum products as a precursor to dividing the gum into individual slab, stick or pellet type units.

BACKGROUND OF THE INVENTION

The process of making and packaging gum products involves a significant amount of machinery. For example, a substantially automated system and method for making slab/stick type gums, is shown in U.S. Pat. No. 6,254,373 entitled Gum Processing and Packaging System, which is assigned to the predecessor of interest of the present assignee. As shown in the '373 Patent, a process and apparatus for the continued production and processing and packaging of a final slab/stick type chewing gum is disclosed. The product is extruded as a continuous tape or ribbon and is eventually flattened into an approximate final cross-sectional size and shape and then inserted into a final gum sizing apparatus. Thereafter, the continuous strip of final chewing gum product is scored, cut into individual pieces and individually wrapped by a standard packaging machine. The present invention is directed towards improvements in the state of the art over such prior systems and equipment as shown in the '373 Patent.

BRIEF SUMMARY OF THE INVENTION

The present invention is directed toward improvements in the conditioning of chewing gum product to attempt to reach the optimal temperature, viscosity, and moisture content for quality and processing reasons, particularly when rolling and/or scoring the chewing gum product in sheet form. Such uniformity better insures that the correct amount of gum is in each individual unit of gum and that the shape, size and consistency is substantially the same. Achieving such uniformity and high volume production with such automation are a significant advantage for cost and quality reasons.

A first patent aspect of the present invention is directed toward gum manufacturing machinery comprising a gum loafing machine have an inlet receiving finished gum product and a forming die providing an outlet proximate a knife that is adapted to generate loaves of finished gum product. A gum conditioner is arranged downstream of the gum loafing machine that has a conveyor running through an environmental enclosure with a temperature control. The conveyor is adapted to convey the loaves of finished gum through the environmental enclosure.

According to the above aspect, the conveyor of the gum conditioner may include at least three conveyors arranged in a stacked vertical configuration with two different operational modes. In a first operational mode, the second conveyor runs in a first direction conveying loaves in a serpentine path over substantially the entire length of the second and third conveyors. In a second operational mode, the second conveyor runs in a second direction opposite the first direction to convey loaves in a cascading path thereby substantially bypassing the length of the second and third conveyors. As such, the residence time of the conveyor can be greatly varied by utilizing more or less of the overall gum conditioning conveyor length as may be desired (speed controls and speed changes to the conveyors may be additionally employed).

Another different feature which may be employed with the first above aspect is that the gum loafing machine may be employed to prepare a generally uniform shape and thickness of the finished gum product to facilitate more uniform conditioning and avoid the otherwise non-uniform and irregularly shaped thicknesses that may be output, for example from a gum mixing extruder that forms the finished gum product. The size of the loaves may be optimized for conditioning as opposed to a form that is necessarily suitable for rolling operations. Further, after the finished gum product is loafed and conditioned within the gum conditioner, a second forming extruder may be employed having a die adapted to form a continuous ribbon from the individual loaves to facilitate further downstream rolling of the sheet by rollers that progressively reduce a thickness of the continuous gum ribbon for subsequent gum dividing operations. As such, conditioning may occur in one form, while rolling and scoring is accomplished in a different form.

Another aspect of the present invention is directed toward gum manufacturing machinery comprising a gum mixer (e.g. at least one of a mixing extruder and a batch mixer) that receives a plurality of gum ingredients and mixes the gum ingredients into a finished gum product. A first forming extruder is arranged downstream of the gum mixer and receives the finished gum and forces the finished gum through a first forming die to generate a substantially uniform output shapes sufficient for conditioning. A gum conditioner is arranged downstream of the first forming extruder and has a conveyor running through an environmental enclosure with a temperature control. The conveyor is adapted to convey the substantially uniform output through the environmental enclosure. Further, and after such conditioning, a second forming extruder is arranged downstream of the gum conditioner that has a second forming die. The second forming extruder forces the finished gum through the second forming die to form a continuous gum ribbon. Rollers are subsequently arranged downstream of the forming extruder to progressively reduce a thickness of a the continuous gum ribbon for subsequent gum diving operations.

A feature according to the above aspect is that a first forming extruder may provide a discontinuous output such as separate loaves to facilitate conditioning whereas the second forming extruder produces the ribbon to facilitate rolling operations.

A further aspect of the present invention is directed toward a method of manufacturing gum comprising of mixing a plurality of gum ingredients into a finished gum; forming the finished gum into a substantially uniform output shape; conditioning the formed finished gum in a controlled temperature environment for a residence time; forming a continuous gum ribbon; progressively reducing the thickness of the continuous gum ribbon; and dividing the gum ribbon into individual pieces of gum.

It is an advantage of this method and further feature that different gum batch recipes for different finished gum products may be run through the same gum line. For example, the method may further comprise running a first gum mixture at a first predetermined residence time for conditioning in a controlled temperature environment; and running a second gum mixture different than the first gum mixture using the same gum line as for the first gum mixture but at a second residence time different than the first residence time for the first gum mixture. This can be further facilitated by use of a conveyor having multiple vertically spaced conveyors with two different operational modes for generating a serpentine path and a cascading path as described previously. Significantly different conditioning residence times may therefore be employed for different gum batch recipes.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 1 is a schematic diagram of an embodiment of gum manufacturing machinery illustrating one operating mode with a cascading path of loaves through a gum conditioner in accordance with an embodiment of the present invention;

FIG. 1A shows a schematic diagram of an alternative embodiment for mixing gum that may be substituted for the mixing extruder shown in FIG. 1;

FIG. 2 is another schematic diagram of the embodiment shown in FIG. 1 but illustrated in a different operational mode with loaves spending a longer residence time with a serpentine path through the gum conditioner as illustrated; and FIG. 3 is a flow diagram illustrating a process for handling and processing finished gum product in accordance with an embodiment of the present invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring to the FIGS. 1-2, gum manufacturing machinery generally indicated at 10 for handling and processing finished gum product 12 is illustrated with, methodology of running through such machinery diagramed in FIG. 3.

The gum manufacturing machinery 10 generally includes a gum mixer which as illustrated in FIG. 1 may take the form of a gum mixing extruder 14; or alternatively as shown in FIG. 1A a batch mixer 16. Each of these may be used to produce a finished gum product 12. For example as illustrated in FIG. 1, the gum mixing extruder 14 includes a plurality of gum ingredient inputs 20 along its length for receipt of gum base and other gum ingredients such as flavorings, sugars, sweeteners, fillers, various agents, and the like. These inputs 20 are arranged along the length of a single mixing screw 22 having different screw mixing elements for input and mixing at different stages during the mixing process. For example, gum mixing extruders or other gum mixers are disclosed for example in U.S. Provisional Patent Application Nos. 61/016, 016; 61/036,626; and 61/045,764, which are assigned to the present assignee, the disclosures of which are hereby incorporated by reference in their entireties. The output from the gum mixing extruder 14 is a finished gum product 12 that is readily suitable for consumption and chewing as it includes the water soluble sweeteners and flavorings desired by the consumer as well as the underlying chewable gum base to facilitate chewing. As illustrated, the output from a gum mixing extruder 14 may be generally irregular or otherwise non-uniform in shape in that it often will be output in an uneven stream of material having a non-uniform thickness of material. The same can be said of the output of a batch mixer 16 in that it is generally irregularly shaped without a consistent thickness. Thus, by producing finished gum product 18, it may generate a non-uniform output 24 as diagrammed in FIG. 3.

Given that the temperature of the finished gum product is not yet suitable or optimal for rolling activities, and that the temperature may need to be cooled or otherwise adjusted to allow the material to set sufficiently, it can be appreciated that the non-uniform output 24 is not conducive to generating uniform conditioning of the finished gum product. As such, a feed conveyor 26 feeds the uneven output 12 into a loafing machine 28 (also referred to herein as a loafing extruder) that forms discrete loaves of finished gum product as in step 27 in FIG. 3. The loafing machine 28 may include a forming extruder 30 that forces the finished gum product through a forming die, thereby forming a uniform extrusion 33 as in FIG. 3, that is periodically cut off into separate loaves 34 with finished gum product loaves being indicated at 36 in FIGS. 1-2. To facilitate the cutting operation 34, a knife 32 is used that periodically moves laterally across the forming die to cut and slice off individual loaves 36.

An output conveyor 38 picks up the loaves cut off from the forming extruder 30 and runs at a slightly faster pace so as to space the individual loaves 36 at regular intervals as they are output from the forming extruder 30 and cut off by knife 32. The forming extruder 30 includes only a single input and does not provide for input or mixing of additional ingredients into the finished gum product at this stage. Instead the loafing machine 28 and forming extruder 30 is merely employed to generate a relatively uniform and consistent thickness of material to facilitate more even conditioning of the finished gum product downstream.

As illustrated, the individual loaves 36 generally take the shape of the extruding die at the output of the forming extruder 30 and may have separate loaves integrally connected by thin webs that may be produced by teeth on the extruding die as illustrated. The loaves may have a slight parallelogram shape or be of slight shape variations in width and length, but the thickness of the individual loaves 36 is preferably between about ½ and 2 inches thick (vertically) with the length and width being between about 6 inches and 18 inches. The length and width dimensions are not as critical or important as it is the minimum thickness in one dimension that controls heat transfer. Thus, the minimum thickness dimension is of importance as this determines the relative residence time necessary for achieving sufficiently uniform viscosity and temperature for forming a thin ribbon to facilitate subsequent rolling and scoring operations.

The output conveyor 38 feeds the individual loaves 36 into a gum conditioner 40 that conditions the loaves of finished gum product 42. More specifically, the gum conditioner 40 adjusts or otherwise conforms the temperature of the finished gum product 12 and attempts to obtain a substantially uniform temperature throughout. The gum conditioner 40 is arranged downstream of the gum loafing machine 28 for receiving the output thereof and includes three vertically stacked conveyors including a top conveyor 44, an intermediate conveyor 46 and a bottom conveyor 48 that are all substantially contained and run through an environmental enclosure 50, such as a long enclosed tunnel. Each of the conveyors 44, 46, 48 is contained in the environmental enclosure 50, such that the gum product carried thereon is subjected to the temperature and humidity controlled environment within the enclosure 50.

The gum conditioner 40 includes a temperature control, a humidity control and a residence time control. The temperature and humidity control can set and/or adjust the temperature and humidity within the environmental enclosure such that it may be different than that of the room in which the machinery is contained. The residence time control is provided with a wide degree of residence time variability in part due to speed adjustment but also due to a unique aspect presented by the arrangement of three conveyors, 44, 46 and 48 and the operational mode variance as illustrated when comparing FIGS. 1 and 2. As a result, a residence time can be predetermined and set and/or adjusted based upon the gum batch recipe 52 as indicated in FIG. 3.

Typically, and depending upon the finished gum product, the raw output of the gum mixing extruder 14 will generally produce a gum output having an average temperature between 40 and 50° C. Within the environmental enclosure 50 of the gum conditioner 40 a generally uniform temperature is controlled to move the finished gum temperature to a substantially consistent and desirable temperature. Specifically, the environmental enclosure 50 may include a controlled temperature between 40° C. and about 50° C.; and a humidity of between about 20 and about 40%. Typically the temperature and humidity will be set at predetermined set points within those ranges depending upon the gum recipe and batch that is being run through the gum line at any particular instant.

As for the residence time, the embodiment provides for a wide control possibility in residence time based on speed control and operational mode. In one embodiment, the residence time may be as fast as about two minutes and as slow as about 20 minutes to provide for a minimal residence time or a very long residence time depending upon the gum batch recipe to appropriately provide the gum in best condition for later processing, such as rolling and scoring into sheets. The conditioner preferably has a residence time control variance of at least 10 minutes during operation thereof that is at least about 1 minute and less than about 30 minutes.

As can be seen in comparing FIGS. 1 and 2, the gum conditioner 40 has two different operational modes. As shown in FIG. 2, a first operational mode is provided in which the loaves follow a serpentine path substantially over the entire length of the intermediate and bottom conveyors, 46 and 48. By having to travel the entire length of the lower two conveyors, the residence time is increased by virtual of the distance over which the finished gum product loaves must travel. However, if such a long residence time is not desired or needed, the distance can be short circuited as shown in FIG. 1 where a second operational mode is provided in which the loaves substantially bypass the length of the second and third conveyors. In this operational mode, the intermediate conveyor 46 runs in an opposite direction as that shown in FIG. 2 to prevent the loaves from reversing direction and instead the loaves cascade over the conveyors with a cascading path, thereby to substantially bypassing the length of the second and third conveyors. As shown, the second intermediate conveyor 46 has a portion that overlaps the top conveyor 44 to receive loaves that vertically drop down from the top conveyor onto the intermediate conveyor and likewise the bottom conveyor 48 has ends that overlap both of the ends of the intermediate conveyor for receipt of loaves that drop down on either the front or back end of the intermediate conveyor depending upon which operational mode is employed.

Depending upon the gum recipe batch being run on the gum line, upon exiting the gum conditioner, the finished gum loaves may have a temperature of between about 40 and 50° C. However, residence time is important and formula dependent to develop crystal structure and/or otherwise set up the firmness of the gum product, even if little or no temperature change occurs. At this point, the loaves are also set up enough with a sufficiently uniform viscosity to facilitate further processing such as rolling and scoring.

Accordingly at this point, a further conveyor 54 feeds the finished gum product loaves (at step 56 in FIG. 3) into a second downstream forming extruder 58. The forming extruder 58 includes a forming die that is thin and elongated such that it produces a continuous finished gum product ribbon (at step 57 in FIG. 3) suitable for subsequent rolling and scoring operations. Specifically, the forming extruder 58 may include twin screws that break up the loaves and force the loaves through an elongate and thin forming die to produce the ribbon 60.

Upon exiting the forming extruder 58, the continuous gum ribbon 60 may be subject to a dusting operation 62 in which a duster 64 sprinkles powdered sweetener on the surface of the continuous gum ribbon 60 so as to prevent sticking and to facilitate better processing during subsequent rolling and scoring operations. It is understood that while such dusting will add some component to the eventual packaged gum, a "finish gum product" is considered to be produced at the very first step illustrated in the output of the gum mixing extruder 14 and the dusting at this point is primarily a processing aid adding only some additional component to the gum.

After passing through the duster 64, the gum ribbon 60 is processed and run through a series of progressive rollers 66 that roll the continuous ribbon sheet to a uniform reduced thickness 68. Once the gum ribbon 60 is progressively rolled to the desired thickness, then a scoring roller 70 may be employed as well as a lateral dividing roller 72. These rollers 70, 72 score and divide the gum ribbon 60 into individual scored sheets 74 as indicated at step 76 in FIG. 3.

From here, the scored sheets 74 are conveyed to a further gum conditioner 78 having a conveyor 80 and an environmental enclosure in the form of a tunnel 82 to facilitate cooling of the individual scored sheets to stiffen the gum material of the sheets sufficiently prior to stacking so as to maintain shape rather than allow material creep. The gum conditioner 78 conditions individual sheets 84 sufficient to facilitate stacking of sheets 86 where the sheets can be stacked and stored in a conditioning room 88. The stacked sheets are then stored in the conditioning room 90 at a lengthy interval to fully condition the gum sheets and achieve a sufficiently cool temperature until such time that the sheets are ready to be divided into individual gum pieces such as stabs or sticks and then packaged as indicated in step 92 in FIG. 3.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of manufacturing gum, comprising:
mixing a plurality of gum ingredients into a finished gum;
forming the finished gum into a substantially uniform output shape;
conditioning the formed finished gum in a controlled temperature environment of a gum conditioner for a residence time, said gum conditioner including a first conveyor vertically stacked with at least a second conveyor and a third conveyor, said conditioning including:
transporting the finished gum to said first conveyor of said gum conditioner;
transporting the finished gum from said first conveyor to said second conveyor;
operating said second conveyor in at least one of a first operational mode and a second operational mode, wherein operating in said first operational mode includes transporting the finished gum from a first end of said second conveyor to said third conveyor such that said finished gum is conveyed in a serpentine path over substantially an entire length of said second and third conveyors, and said second operational mode includes transporting the finished gum from an opposing end of said second conveyor to said third conveyor such that said finished gum is conveyed along a cascading path, thereby substantially bypassing said length of said second and third conveyors, wherein said first operational mode creating a longer residence time for the finished gum in said gum conditioner and said second operational mode creating a shorter residence time for the finished gum in said gum conditioner; and
outputting the finished gum from said gum conditioner.

2. The method of claim 1, further comprising: running a first gum mixture at a first residence time via said first operational mode;
running a second gum mixture different than the first gum mixture using the same gum conveying path as for the first gum mixture but at a second residence time different than said first residence time for the first gum mixture via said second operational mode.

3. The method of claim 1, further comprising controlling speed of the conveyors to provide residence time variance in combination with selective use of conveyor lengths of at least 10 minutes variance.

4. The method of claim 1, wherein said forming the finished gum into a substantially uniform output shape comprises bricking intermittently spaced loaves of finished gum having a vertical thickness of between about 1 and about 3 inches.

5. The method of claim 1, further including:
forming a continuous gum ribbon;
progressively reducing a thickness of the continuous gum ribbon; and
dividing the gum ribbon into individual pieces of the gum.

6. The method of claim 5, wherein said forming of said continuous ribbon occurs downstream of said conditioning.

* * * * *